UNITED STATES PATENT OFFICE.

BALTHASAR E. REUTER, OF CHICAGO, ILLINOIS, ASSIGNOR TO REUTER PROCESS COMPANY, OF CHICAGO, ILLINOIS, A CORPORATION OF ILLINOIS.

PROCESS OF SAPONIFYING GLYCERIDS.

1,298,563.

Specification of Letters Patent. Patented Mar. 25, 1919.

No Drawing. Application filed April 9, 1914. Serial No. 830,590.

*To all whom it may concern:*

Be it known that I, BALTHASAR E. REUTER, a citizen of the United States, residing at Chicago, in the county of Cook and State of Illinois, have invented a new and Improved Process of Saponifying Glycerids, of which the following is a specification.

This invention relates to an improvement in the art of saponifying glycerids with the aid of a saponifier, preferably a catalytic saponifier, namely, such as is used in the process described in United States Patent No. 601,603, dated March 29, 1898, and its various equivalent processes such as those of United States Patents No. 1,082,662 of December 30, 1913, No. 1,058,633, of April 8, 1913, and No. 1,079,437 of November 25, 1913.

The fatty acids resulting from such processes are, as a rule, highly colored, or at any rate, sufficiently colored as to require a subsequent cleansing treatment to render them useful for the production of white, or commercially white materials, such as candles, stearic acid and soaps.

I have found that this tendency to discolorization can be greatly overcome in a process such as that of United States Patent No. 601,603 referred to, wherein the entire amount or substantially the entire amount of saponifier to be used is added directly to the material about to undergo saponification. I have discovered that by diminishing the length of time of contact of the unsaponified material and of the fatty acid product of the saponification on the one hand, with the watery portion of the mix and the dissolved products contained in the fatty material, on the other hand, that this discolorization of the fatty acid product can be in a great measure reduced. Upon this discovery, I have based the following invention, which in outline is, broadly, as follows:—I add to the glycerid to be saponified, the total amount of saponifier, preferably catalytic saponifier, and the total amount of water, and the necessary amount of mineral acid. I then boil for a period of time which is a fraction of the entire required boiling period, for example, one-third, say twenty-four (24) hours; I then allow the result to separate, assisting such separation, if necessary, by the use of sulfuric acid and upon completed separation I withdraw the entire watery portion together with any, and preferably all, of the discolored material which separates as what may be termed, a ribbon just above the watery layer and just below the unsaponified glycerid, and the fatty acid; thereupon, or concurrently, I separate the watery portion from the above referred to ribbon, return, preferably, the entire amount of watery material to the saponification vessel, and proceed with the boiling for another period of, for example, twenty-four (24) hours. The removal of the watery layer and the discolored material is then repeated as before, and the watery layer when separated from the discolored layer or ribbon is returned to the saponification vessel and the saponification is then resumed and carried to completion. It occasionally happens that it is well to add a fraction say 10%, of the original amount of saponifier to the watery portion prior to one or more of the successive boils; the same effect can also be obtained by originally taking an additional amount of the saponifier indicated, which additional amount is in general to be sufficient to make up for the loss of saponifier removed with the ribbon. As to the amount of such excess (usually 15 to 25%) of saponifier, the operator must have some regard to the nature and quality of the materials taken for saponification and the relative or actual amount of the ribbon removed. I illustrate this by means of the following example, which is taken from a factory operation; but my invention is not limited to the materials or conditions herein used for the purposes of illustration.

Place 50,000 lbs. of glycerid (consisting, for example, of equal parts of hydrolyzed fish oil and of summer yellow cottonseed oil) in a suitable saponifying apparatus, add thereto 33,000 lbs. of water, 150 lbs. of sulfuric acid containing 80% $H_2SO_4$, 300 lbs. of the naphthalene variety of the Twitchell saponifier, (United States Patent No. 628,503 of July 11, 1899) boil for twenty-four (24) hours; remove the ribbon and the water; separate the water from the ribbon; return the water to the stock, and boil for another twenty-four (24) hours; repeat this operation for the third boil, but add to the water before it is returned 50 lbs. of the above 80% sulfuric acid, and 75 lbs. of the above Twitchell saponifier. At the conclusion of the boil, the fatty acids are ready for use in the production of candles, stearic acid or soap.

The results are improved and made more certain of achievement, by exclusion of air during the saponification combined with efficient agitation.

I claim:

1. In the art of saponifying glycerid the improvement which comprises removal of the watery layer and discolored fatty material from the saponifying apparatus and return of the watery portion freed from the discolored fatty material.

2. The process of saponifying glycerid which consists in bringing about saponification and thereby forming a ribbon of colored material between the watery and non-watery contents of the apparatus and removing such colored ribbon from the saponifying apparatus.

3. The process of saponifying glycerid which comprises adding to the glycerid water sulfuric acid and saponifier; bringing about saponification; interrupting said saponification; removing the watery portion and the discolored fatty portion of the contents of the saponifying apparatus and returning to the saponifying apparatus the watery portion so removed and resuming the saponifying operation.

4. The process of saponifying glycerid which comprises treating the glycerid with water, acid and saponifier, bringing about saponification, interrupting the saponifying operation, removing the colored material accompanying the non-watery portion of the contents of the saponifying apparatus, and resuming the saponifying operation.

5. The process of saponifying glycerid which consists in bringing about saponification, interrupting the saponification, removing the watery layer and discolored fatty material from the saponifying apparatus, returning the watery portion to the apparatus, and resuming the saponifying operation.

6. The process of saponifying glycerid which consists in bringing about saponification, interrupting the saponification, removing the colored material accompanying the non-watery portion of the contents of the saponifying apparatus, and resuming the saponifying operation.

7. The process of saponifying glycerid which consists in adding water, sulfuric acid, and saponifier to the glycerid under treatment, boiling the mixture thus formed, interrupting the boiling operation before saponification is completed, settling out the watery portion of the mixture by means of sulfuric acid, drawing off the watery portion and the "ribbon of impurity" which separates the watery portion from the unsaponified glycerid and fatty acid, separating the "ribbon of impurity" from the watery portion, returning the watery portion to the mixture, and resuming the boiling operation.

8. The process of saponifying glycerid which consists in adding water, mineral acid, and saponifier to the glycerid under treatment, boiling the mixture thus formed, interrupting the boiling operation before saponification is completed, permitting the watery portion to settle out of the mixture, withdrawing the watery portion and the layer of discolored material between the watery portion and the unsaponified glycerid and fatty acid, separating the discolored material from the watery portion, returning the watery portion to the mixture, and resuming the boiling operation.

9. The method which consists in successively performing the following operations: boiling a mixture of glycerid, water, and saponifier, interrupting the boiling operation before saponification is completed, settling the watery portion of the mixture out of the unsaponified glycerid and fatty acid, removing the ribbon of discolored material which separates the watery portion from the unsaponified glycerid and fatty acid, and resuming the boiling operation.

10. The method of saponifying glycerid which consists in successively heating a mixture of the glycerid under treatment, water, and saponifier, settling out the watery portion of the mixture between each heating of the mixture, and removing the discolored material between the watery portion and unsaponified glycerid and fatty acid.

11. The process of saponifying glycerid which consists in bringing about saponification and thereby forming a ribbon of colored material between the watery and non-watery contents of the apparatus, removing such colored ribbon from the saponifying apparatus and thereupon replenishing the mixture under treatment with a supply of water containing no discolored fatty material.

In testimony whereof I have hereunto signed my name in the presence of two subscribing witnesses.

BALTHASAR E. REUTER.

Witnesses:
M. E. McNINCH,
E. M. LOCKWOOD.